(12) United States Patent
Biester et al.

(10) Patent No.: US 9,163,484 B2
(45) Date of Patent: Oct. 20, 2015

(54) ACTUATOR

(75) Inventors: Klaus Biester, Wienhausen (DE); Norbert Lenz, Celle (DE)

(73) Assignee: OneSubsea IP UK Limited, London (GB)

( * ) Notice: Subject to any disclaimer, the term of this patent is extended or adjusted under 35 U.S.C. 154(b) by 358 days.

(21) Appl. No.: 13/383,817

(22) PCT Filed: Jul. 16, 2009

(86) PCT No.: PCT/EP2009/005186
§ 371 (c)(1), (2), (4) Date: Mar. 6, 2012

(87) PCT Pub. No.: WO2011/006519
PCT Pub. Date: Jan. 20, 2011

(65) Prior Publication Data
US 2012/0153198 A1    Jun. 21, 2012

(51) Int. Cl.
*F16K 31/02*    (2006.01)
*E21B 41/00*    (2006.01)
(Continued)

(52) U.S. Cl.
CPC ............. *E21B 41/00* (2013.01); *E21B 33/0355* (2013.01); *F16K 31/048* (2013.01)

(58) Field of Classification Search
USPC .................. 251/110, 129.11, 129.13, 129.19, 251/129.2, 249.5, 252, 264, 276, 326, 266, 251/267; 74/89, 89.34, 89.38; 166/66.7
See application file for complete search history.

(56) References Cited

U.S. PATENT DOCUMENTS 4,920,811 A * 5/1990 Hopper ............................... 74/2
5,195,721 A * 3/1993 Akkerman ............... 251/129.13

(Continued)

FOREIGN PATENT DOCUMENTS

DE    10134428 A1    1/2003
EP    0984133 A1    3/2000
(Continued)

OTHER PUBLICATIONS

International Search Report for Application No. PCT/EP2009/005186, dated Jul. 28, 2010, ISA: European Patent Office.

*Primary Examiner* — Matthew W Jellett
(74) *Attorney, Agent, or Firm* — Chamberlain Hrdlicka (57) ABSTRACT

An actuator for displacing a control device including a valve, a gate valve or the like, in particular for use in oil or gas production systems, said actuator comprising an electric drive and a thread drive displaceable by means of said electric drive. The thread drive comprises at least a threaded spindle and a screw nut. The threaded spindle is displaceable in a substantially axial direction between an advanced position and a retracted position so as to displace the control device.

In order to improve an actuator of this kind in such a way that advantages of an already known actuator will be maintained on the basis of a smaller number of components and a more compact structural design and a reduction of the manufacturing costs can simultaneously be accomplished, the electric drive comprises at least one torque motor with a hollow shaft, said hollow shaft being connected to the driven side of a safety clutch unit such that it is secured against rotation relative thereto. This safety clutch unit is, on the driving side thereof, connected in a motion-transmitting manner to the screw nut which is supported such that it is rotatable and axially non-displaceable. In this way, it is additionally achieved that the actuator in question can also be used for units that are already in use.

22 Claims, 4 Drawing Sheets (51) Int. Cl.
*E21B 33/035* (2006.01)
*F16K 31/04* (2006.01)

(56) References Cited

U.S. PATENT DOCUMENTS

| | | | |
|---|---|---|---|
| 6,257,549 B1 * | 7/2001 | Hopper | 251/129.11 |
| 6,446,519 B1 * | 9/2002 | Biester | 74/89.16 |
| 6,561,480 B1 * | 5/2003 | Komiya et al. | 251/129.12 |
| 7,007,922 B2 * | 3/2006 | Biester et al. | 251/129.11 |
| 7,172,169 B2 * | 2/2007 | Biester | 251/129.11 |
| 7,231,842 B2 * | 6/2007 | Biester et al. | 74/89.25 |
| 7,615,893 B2 * | 11/2009 | Biester et al. | 307/82 |
| 8,274,245 B2 * | 9/2012 | Biester et al. | 318/373 |
| 8,281,863 B2 * | 10/2012 | Voss | 166/351 |
| 2003/0167864 A1 | 9/2003 | Biester | |

FOREIGN PATENT DOCUMENTS

| | | |
|---|---|---|
| GB | 2364396 A | 1/2002 |
| WO | 2005014973 A2 | 2/2005 |
| WO | 2007045260 A1 | 4/2007 |
| WO | 2008125136 A1 | 10/2008 |

* cited by examiner

ACTUATOR

CROSS-REFERENCE TO RELATED APPLICATIONS

This application is a 35 U.S.C. §371 national stage application of PCT/EP2009/005186 filed Jul. 16, 2009, which is incorporated herein by reference in their entireties for all purposes.

The invention relates to an actuator for displacing a control device including a valve, a gate valve or the like, in particular for use in oil or gas production systems, said actuator comprising an electric drive and a thread drive displaceable by means of said electric drive and comprising at least a threaded spindle and a screw nut, said threaded spindle being displaceable in a substantially axial direction between an advanced position and a retracted position so as to displace the control device.

Such an actuator is known from WO 2008/125136. The actuator in question serves e.g. to displace a gate valve of a control device to an open or closed position. The known actuator comprises a motor-gear unit including the respective electric drive. In addition, a position holding means is used, which holds the position attained by the threaded spindle and which especially prevents the threaded spindle from returning automatically from the attained position.

It is the object of the present invention to improve an actuator of the type mentioned at the beginning in such a way that advantages of the actuator described at the beginning will be maintained on the basis of a smaller number of components and a more compact structural design and that a reduction of the manufacturing costs can simultaneously be accomplished. The present invention additionally guarantees that the actuator in question can also be used for units which are already in use.

This object is achieved by the features of claim 1.

According to the present invention, the electric drive comprises at least one torque motor. Such a torque motor is a gearless direct drive with very high torques and a comparatively small number of revolutions. It is provided with a hollow shaft which is driven directly by the torque motor. According to the present invention, the hollow shaft is connected to a driven side of a safety clutch such that it is secured against rotation relative thereto. The safety clutch is especially provided for preventing collision damage. Such collision damage could otherwise be caused, if the threaded spindle were displaced beyond its advanced position or its retracted position by the torque motor with a high torque, which might cause damage to the actuator or the control device connected thereto.

The safety clutch unit is, on its driving side, connected in a motion-transmitting manner to the screw nut which is supported such that it is rotatable and axially non-displaceable.

The use of a gearbox can be dispensed with in the case of the present invention. Instead, the torque motor is used as a slowly running drive for directly displacing the thread drive and, via said thread drive, the control device.

Such a torque motor is additionally characterized by a compact structural design and a high rigidity. Furthermore, the torque motor is highly efficient, it can easily be integrated in the respective actuator and it is highly dynamic. The torque motor can in particular be composed of individual components so that it can be integrated in the respective actuator directly and easily and so that it will only require little space.

Furthermore, such a torque motor is easy to maintain, easy to retrofit and, like the associated safety clutch unit, it can be used within a large temperature range.

The associated safety clutch unit is a torsionally stiff safety clutch which is free from backlash and which also has a compact and simple structural design. The respective disengaging moment of the safety clutch can be adjusted easily and with high precision. Reengagement can take place in an angularly synchronous manner. This means that the clutch will reengage after precisely 360° and will again be ready for operation, after elimination of the excessive load in question. It is, however, also possible to implement the safety clutch as a ratchetting clutch. This means that it will reengage automatically at e.g. 30°, 45°, 60° and 90° and that it will then again be ready for operation. Likewise, it is possible that only a limited separation of the driven and driving sides takes place in response to excessive loads, or that excessive loads cause a permanent separation of the driven and driving sides, which will then be reversed by an appropriate external signal.

The thread drive can be configured as a roller thread drive.

One example for the above-mentioned control device is a so-called gate valve in the case of which a valve slide will, in the field of crude oil production, be acted upon by the respective bore hole pressure such that the valve will be forced in the direction of the closed position and the threaded spindle will, consequently, be acted upon by said pressure as well. In order to prevent a pressure-induced rotation of the threaded spindle, the torque motor is operated e.g. with a standby current which generates a sufficiently large holding torque. In this way, the present invention guarantees that any attained position can be held also against such an application of pressure. When the holding torque is eliminated by an appropriate propulsion current of the torque motor, the control device will be displaced by the thread drive in the respective direction of displacement.

A simple structural design of the torque motor and, consequently, also of the actuator can especially be seen in an arrangement in which the torque motor is secured in position directly on an outer side of the hollow shaft.

For this kind of fastening, a plurality of possibilities is imaginable. Such fastening can e.g. easily be realized by providing the outer surface of the hollow shaft with a radially outwardly projecting abutment projection, the rotor being then retained between said abutment projection and a counterelement. This will also facilitate mounting, especially in cases in which the torque motor is composed of individual components. The rotor can simply be pushed onto the hollow shaft until it abuts on the abutment projection and can then be fixed at this attached position by the counterelement. The other parts of the torque motor can be mounted subsequently.

Especially for oil or gas production systems, it is normally necessary that all drives or other units are provided in redundant form. As regards the electric drive, this can, according to the present invention, be achieved e.g. by arranging two torque motors on the hollow shaft. If one of the torque motors should fail because of damage, the other torque motor will still be able to rotate the hollow shaft and, consequently, the thread drive for displacing the control device.

For easily arranging the respective screw nut and for supporting it in a rotatable manner, it will be possible to provide a connection sleeve between the driving side of the safety clutch unit and the screw nut, so as to movably couple said components. The connection sleeve is connected to the driving side of the safety clutch unit on one side thereof and to the screw nut on the other side thereof. Another possibility existing in this context is that the screw nut is arranged, e.g. partially, within the connection sleeve or inserted partially into said connection sleeve.

For fixing the safety clutch unit to the connection sleeve in a simple manner, it is imaginable to arrange the safety clutch unit on a driving journal projecting axially from the connection sleeve and securing it to said driving journal at is driving side. This driving journal can be inserted, at least partially, into a respective axial opening of the safety clutch unit.

In order to allow a rotationally-fixed connection between the driven side of the safety clutch unit and the driving journal, a clamping device, such as a fitted key, a clamping hub or the like, can be provided between the safety clutch unit, i.e. the driving side of said safety clutch unit, and the driving journal.

The driving journal can be provided with an axial hole so that various units of the actuator can be passed therethrough over their axial length. In this way, such units can be passed not only through the hollow shaft of the torque motor but also through the axial hole of the driving journal.

For protecting the actuator and, in particular, the components comprised therein, the actuator can comprise a housing. The actuator may comprise at least two housing sections, which can be detached from one another and which define the actuator housing, so that, if necessary, it will be possible to remove, maintain or replace by spare parts only certain components of the actuator. The first housing section can accommodate the electric drive, whereas the second housing section can accommodate at least the thread drive.

Furthermore, the second housing section may also comprise the respective connection sleeve. In this context, an arrangement should also be considered advantageous in the case of which a rotation-type bearing unit is arranged between the inner side of the second housing section and the outer side of the connection sleeve so as to rotatably support the latter.

A rotation of the screw nut leads to a corresponding axial movement of the threaded spindle in its direction of displacement. In order to prevent in this context a simultaneous rotation of the threaded spindle, the threaded spindle can be supported at a guide sleeve in an axially displaceable but non-rotatable manner.

This kind of support can easily be realized when the guide sleeve is provided with at least one guide slot extending in the direction of displacement of the threaded spindle, said guide slot being engaged by a guide pin which projects radially outwards relative to the threaded spindle. This guide pin is connected to the threaded spindle directly or indirectly, thus preventing the threaded spindle from rotating. Such rotation is undesirable, since the threaded spindle is connected to the control device and is intended to displace said control device substantially only linearly in the axial direction.

For increasing the stability and for further supporting the threaded spindle, it may also prove to be advantageous when the guide sleeve is provided with an opening insert which covers an end opening of the second housing section opposite to the first housing section and which is provided with an opening for passing the threaded spindle therethrough. The threaded spindle can be displaceably supported as well as sealed off in this opening of the opening insert.

It is possible to connect the threaded spindle directly to the respective control device, or to provide a piston rod between these two components. When no such piston rod is provided, the structural design of the actuator will become even more compact. Otherwise, the threaded spindle can be connected to such a piston rod at its end facing the control device. The piston rod is then connected to a valve slide or the like of the control device in question.

For indirectly connecting the guide pin and the threaded spindle, a connection element may be releasably secured to the threaded spindle, the guide pin projecting radially from said threaded spindle. This connection element may have a suitable opening for passing the threaded spindle therethrough.

Likewise, it is possible that the threaded spindle extends only up to the respective opening of the connection element, and that also said connection element is directly connected to a piston rod or the control device.

A motion sensor, whose sensor element is connected in particular to the threaded spindle, can be arranged at one end of the actuator so that conclusions with respect to the respective displacement of the control device can be drawn from a displacement of the thread drive. A respective displacement of the threaded spindle will, in this way, be transmitted to the sensor element and detected by the motion sensor.

In order allow an easy supply of the actuator from outside, a plug device can be provided on the actuator, said plug device being used for transmitting control signals/data and/or a supply voltage.

It is also possible to connect the second housing section to a connection housing, which is adapted to be flange-mounted on a feed line or a control device housing. This connection housing is standardized and can, by means of a remotely controlled vehicle, easily be attached to the feed line or the control device housing from outside.

Likewise, it is also possible to arrange a spring sleeve for accommodating especially a return spring between the connection housing and the second housing section. When such a spring sleeve is used, the above-mentioned piston rod will normally be used as well. This piston rod can be dispensed with, if no such spring sleeve is used.

The return spring can especially be used for displacing, if the electric power supply should fail, the threaded spindle to its retracted position, whereby also the control device will be displaced to a specific position. This means that, e.g. in the case of a gate valve of a control device, a feed line for crude oil or the like will be closed.

In this connection, the return spring can e.g. be compressed during a displacement of the threaded spindle to the advanced position, so that, even if the electric power supply should fail, the threaded spindle can be returned to the retracted position by means of the pressure applied by said return spring. This can, by way of example, easily be achieved by arranging the return spring such that it is essentially operative between the spring sleeve and the threaded spindle.

The hollow shaft can be rotatably supported at both end portions thereof, especially the first end portion being rotatably supported on the inner side thereof and the second end portion being rotatably supported on the outer side of the hollow shaft, so that the hollow shaft can be supported rotatably in an easy manner, without any limitations existing e.g. with respect to the arrangement of the safety clutch unit.

Due to the exterior support of the second end portion, said second end portion can easily be connected to the driven side of the safety clutch unit either to the end of the hollow shaft or the inner side of said hollow shaft such that it is secured against rotation relative thereto.

Depending on the requirements to be satisfied, it is also possible that more than two torque motors are associated with the hollow shaft. Furthermore, more than one actuator can be provided for a control device by arranging e.g. two or more of these actuators in parallel on one side and/or on opposed sides of the control device. As for the rest, each of these actuators can have a structural design corresponding to that which has been explained hereinbefore.

In order to allow, in spite of the use of a torque motor, a change of the transmission ratio between the electric drive and the thread drive in a simple way and with little space requirements, a gear unit, in particular a so-called harmonic drive, can be arranged between the electric drive and the thread drive. Such a gear unit is described e.g. in WO 2008/125136. Instead of a harmonic drive, it is also possible to use some other kind of gear, e.g. a planetary gear set or the like. A harmonic drive normally comprises three parts, viz. a cylindrical, deformable flexspline with external teeth, an annular element with internal teeth and an elliptical disk or wave generator. The cylindrical, deformable flexspline is connected to the connection sleeve such that it is secured against rotation relative thereto. The annular element is connected to a housing section through a flange. The annular element is in engagement with the cylindrical flexspline via a few teeth. The cylindrical flexspline abuts on the elliptical disk or the wave generator on the inner circumference thereof. The wave generator is connected to the hollow shaft and the safety clutch unit, respectively, such that it is secured against rotation relative thereto.

The harmonic drive is advantageous insofar as, due to the high transmission, the electric drive only has to provide a very small holding force or holding torque so as to counteract an application of pressure by the control device.

An even more compact structural design of the actuator can be accomplished e.g. by arranging the safety clutch unit substantially within the hollow shaft. Also the driven side of the safety clutch unit can be fastened to the interior of the hollow shaft or to the hollow shaft end facing away from the thread drive.

One example for an arrangement of the safety clutch unit in the interior of the hollow shaft can be seen in that the hollow shaft is provided with a constriction of diameter to which the driven side of the safety clutch unit is releasably connected.

It has already been pointed out that, especially in the field of oil and gas production, the electric drive should be provided in redundant form. This can be done by providing e.g. two or more individual motors so that, if one motor should fail, the other motors will still guarantee an adequate operation of the actuator. It is, however, also imaginable to implement the actuator as a dual-winding torque motor. Such a dual-winding torque motor comprises two separate, independent stator windings. These stator windings can be intertwined, but they can be used separately for actuating the torque motor as independent stator windings. When such a dual-winding torque motor is used, an arrangement of two or more torque motors can be dispensed with.

In addition to an arrangement of the safety clutch unit in the interior of the hollow shaft, it may also be advantageous when also the connection sleeve is arranged within the hollow shaft, at least with its driving journal.

In the case of such an arrangement of the hollow shaft, the hollow shaft may, if desired, also be rotatably supported in a different way, as has already been explained hereinbefore. For example, the first end portion of the hollow shaft may be rotatably supported on the outer side thereof and the inner side of said first end portion may be rotatable relative to the connection sleeve.

The rotation relative to the connection sleeve will only become effective, if the safety clutch unit decouples in response to excessive loads, whereas under normal conditions the hollow shaft and the connection sleeve rotate in common.

The sensor element can extend up to and into the piston rod and/or up to the control device, so that not only the displacement of the threaded spindle can be detected precisely by means of the motion sensor. In this way, the movement of the piston rod and also of the control device can be detected directly.

It has already been pointed out that the actuator has a modular design, cf. in particular the first and second housing sections and the components of the actuator arranged therein. It is, however, also possible, especially in the case of very compact actuators, to form the first and second housing sections integrally with one another, i.e. the actuator comprises substantially one housing which is adapted to be fixed to the respective control device, either directly or by making use of an additional connection housing.

In the following, advantageous embodiments of the invention will be explained in more detail with reference to the enclosed figures of the drawing, in which.

Figure 1:
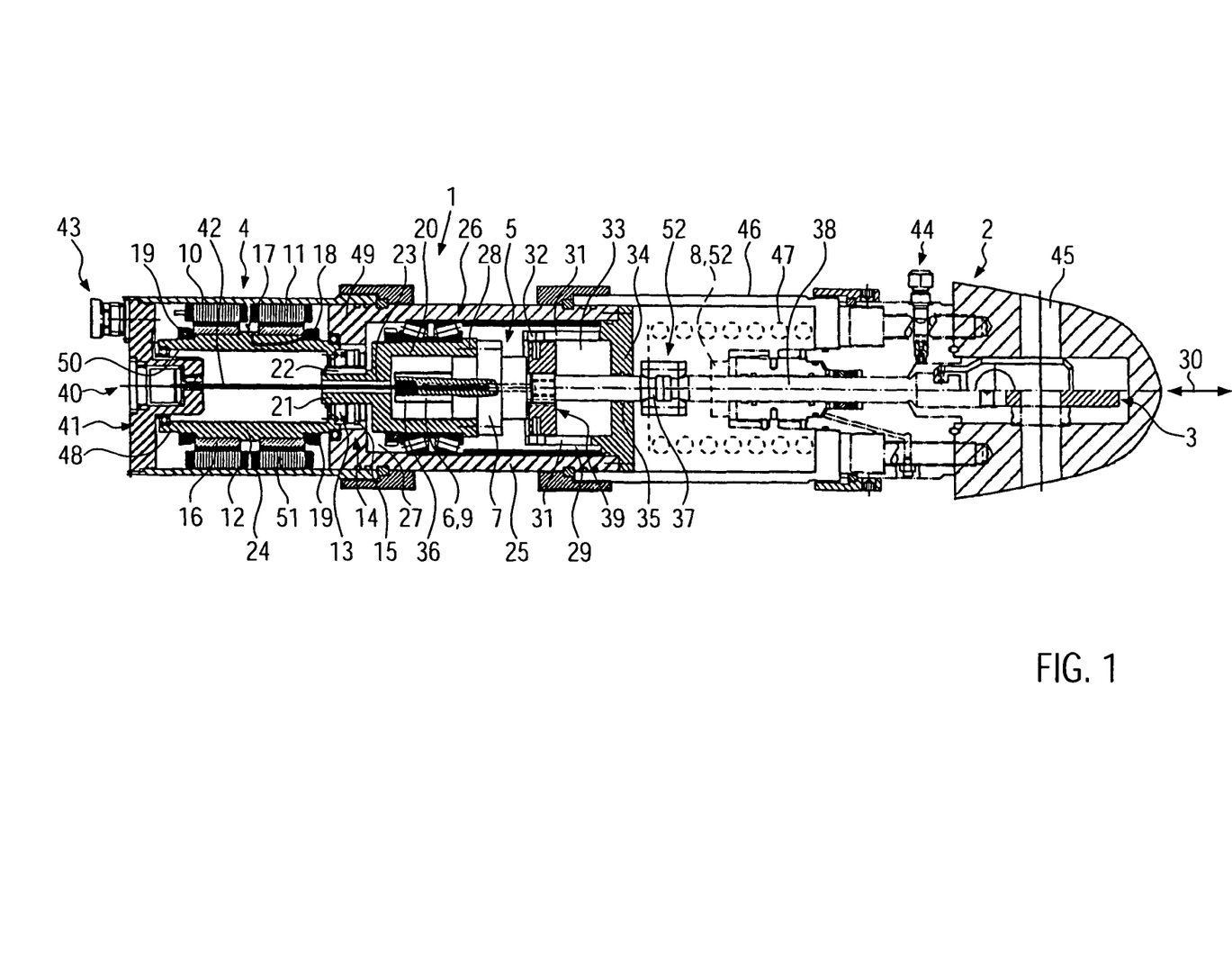
FIG. 1 shows a longitudinal section through a first embodiment of an actuator.

FIG. 1 shows a longitudinal section through a first embodiment of an actuator 1 according to the present invention. This actuator 1 is arranged on a control device 2, which is provided with a gate valve 3 for opening and closing a feed line 45. FIG. 1 shows the gate valve 45 at an open position allowing an unhindered flow through the feed line 45. The gate valve 3 is adapted to be displaced in respective directions of displacement 30, in particular for closing the feed line 45. To this end, the gate valve 3 is connected to the actuator 1 by means of a piston rod 38 which is formed integrally therewith.

The actuator 1 comprises a first and a second housing section 24, 25. The second housing section 25 is followed by a spring sleeve 46. A connection housing 44, which is adapted to be flange-mounted on the feed line 45, is provided between said spring sleeve 46 and the feed line 45. The housing sections as well as the spring sleeve and the connection housing are sealed off from one another and they are releasably connected via screw-on rings or the like.

The first housing section 24 of the actuator 1 has arranged therein an electric drive 4. This electric drive 4 comprises two torque motors 10, 11. Such a torque motor is a gearless direct drive with very high torques and a comparatively small number of revolutions. The torque motors each comprise a rotor 16 and a stator 51. The rotor is normally equipped with permanent magnets and the stator 51 with a multi-pole stator winding. Each of respective rotors 16 is arranged on the outer side 17 of a hollow shaft 12 where it is secured in position. For the purpose of fastening, the outer side 17 of the hollow shaft is provided with e.g. an abutment projection 18, which, in the axial longitudinal direction of said hollow shaft, projects radially outwards therefrom approximately in the middle. Respective rotors 16 abut on this abutment projection 18 on both sides thereof and are secured in position by a counter-element 19 or the like.

The hollow shaft 12 is rotatably supported at its end portions 48 and 49. The first end portion 48 is rotatably supported on the inner side 50 thereof on a sensor housing projecting into the hollow shaft 12. In this sensor housing, a motion sensor 40 is arranged at the end 41 of the actuator. The second end portion 49 of the hollow shaft is on the outer side 17 thereof supported such that it is rotatable relative to the second housing section 25. At this second end portion 49, the hollow shaft 12 is connected to a driven side 13 of a safety clutch or safety clutch unit 14 such that it is secured against rotation relative thereto. The safety clutch 14 is in this way directly connected to the hollow shaft 12 and it has a compact structural design. In addition, such a safety clutch 14 is free from backlash and it exhibits only a very small hysteresis during coupling/decoupling. If excessive loads should occur, the power train will be forcibly separated by the safety clutch within milliseconds. The respective disengagement torque for effecting a forcible separation is normally adjustable. For reengagement of the clutch, various functional principles are possible. In the case of an angularly synchronous reengagement, the clutch will reengage after precisely 360°, after elimination of the respective excessive load, and will then again be ready for operation. It is, however, also possible that automatic engagement takes place at 30°, 45°, 60° and 90°. In this way, a ratchetting clutch is defined. It is also possible that only a limited separation of the driven and driving sides takes place in response to excessive loads.

The safety clutch is, on its driving side 15, connected to a connection sleeve 20 such that it is secured against rotation relative thereto. This rotationally-fixed connection can be established via an appropriate clamping device, such as a clamping cone, a fitted key 22 or the like. The clamping of the driving side 15 of the safety clutch 14 relative to the connection sleeve 20 is effected via a driving journal 21 projecting axially from the connection sleeve 20 in the direction of the hollow shaft 12. The safety clutch is arranged on this driving journal 21. On the opposite end of the connection sleeve 20, a screw nut 7, which constitutes part of a thread drive 5, is arranged such that it is secured against rotation relative thereto. For rotatably supporting the connection sleeve 20, a rotation-type bearing unit 26 is arranged on the outer side 28 of said connection sleeve. This rotation-type bearing unit 26 is arranged between said outer side 28 and an inner side 27 of the second housing section 25.

The thread drive 5 comprises, in addition to the screw nut 7, also a threaded spindle 6. This threaded spindle 6 extends from the interior of the connection sleeve 20, cf. its end 36, through the screw nut 7 up to and into a guide sleeve 29, cf. its end 37. When the hollow shaft 12 rotates and when this rotation is transmitted via the safety clutch 14 to the connection sleeve 20 and the screw nut 7, the threaded spindle 6 can be displaced between an advanced position 8 and a retracted position 9 in directions of displacement 30.

In order to prevent the threaded spindle 6 from rotating during axial displacements, the guide sleeve 29 is provided with opposed guide slots 31. These guide slots 31 are engaged by guide pins 32, which project radially relative to the threaded spindle 6. By means of this engagement between the guide pin 32 and the complementary guide slot 31, the threaded spindle 6 is supported in an axially displaceable but non-rotatable manner.

The respective guide sleeve 29 is releasably secured to an end of the second housing section 25, said end being disposed in opposed relationship with the safety clutch 14.

The arrangement of the guide pins 32 is effected via a connection element 39 which can e.g. be releasably secured directly to the threaded spindle 6. The respective guide pins 32 project radially outwards from this connection element 39.

A sensor element 42 of the motion sensor 40 extends up to and into the interior of the threaded spindle 6, said sensor element 42 extending also through the hollow shaft 12 and through an axial hole 23 in the driving journal 21.

In the embodiment shown in FIG. 1, the threaded spindle 6 extends through a passage opening 35 in an opening insert 24 of the guide sleeve 29 up to a coupling means 52. The opening insert 34 is formed integrally with the rest of the guide sleeve 29 and closes the respective end opening 33. The coupling means 52 serves to connect the respective end of the threaded spindle 6 to the piston rod 38. The coupling means 52 is adapted to be moved within the spring sleeve 46 in the direction of displacement. Furthermore, the spring sleeve 46 has also arranged therein a return spring 47. This return spring 47 is arranged such that it is operative between the spring sleeve 46 and the piston rod 38 and threaded spindle 6, respectively. When the threaded spindle 6 and the piston rod 38 are displaced in the direction of the advanced position 8, the return spring 47 will be compressed and, if the electric power supply for the electric drive 4 should fail, the return spring 47 will be able to apply pressure in particular to the threaded spindle 6 which can be returned to its retracted position 9 in this way.

The advanced position 8 attained by a displacement of the coupling means 52 is shown in FIG. 1 by a broken line.

Furthermore, the end 41 has formed thereon a plug device 43 through which a transmission of data/signals and of a supply voltage can be effected.

Figure 2:
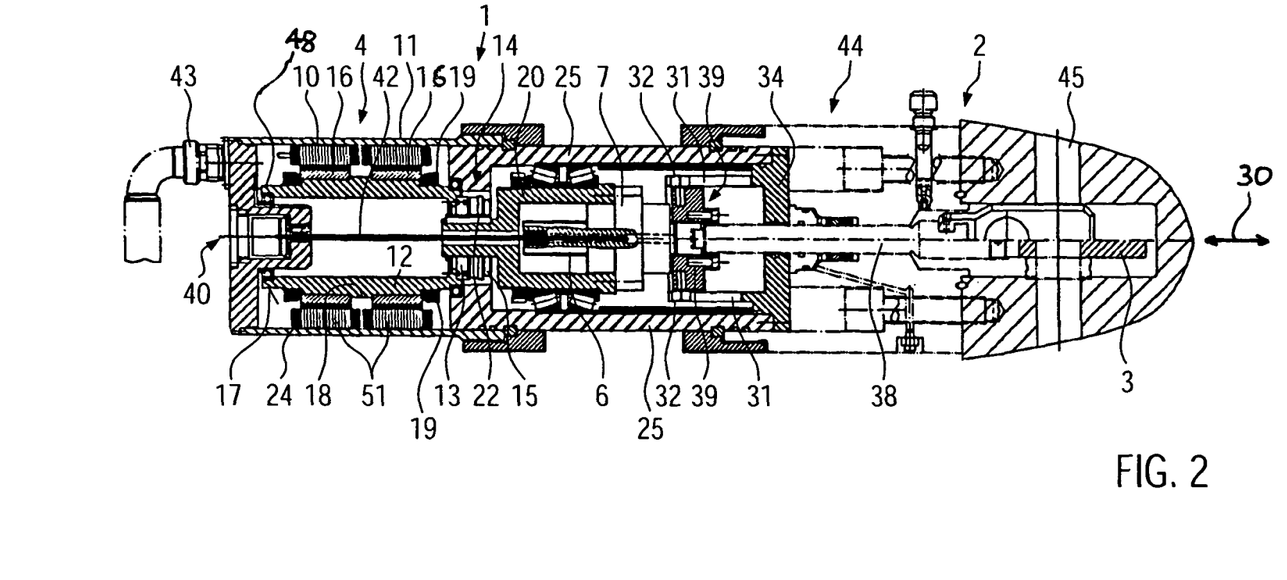
FIG. 2 shows a longitudinal section, analogously to FIG. 1, through a second embodiment of an actuator according to the present invention.

FIG. 2 shows a longitudinal section through a second embodiment of an actuator 1 with a corresponding control device 2 analogously to FIG. 1. Identical components are identified by identical reference numerals and only part of said components will be mentioned in the following.

The embodiment according to FIG. 2 differs from that according to FIG. 1 in particular insofar as it does not comprise any spring sleeve 46, so that the actuator 1 has an even more compact structural design and is adapted to be directly secured to the feed line 45 by means of the connection housing 44. In addition, the piston rod 38 is connected via the connection element 39 to the threaded spindle 6 in a motion-transmitting manner. Analogously to FIG. 1, the connection element 39 serves to guide the threaded spindle 6 and the piston rod 38 in the direction of displacement 30 by means of the guide pins 32 projecting radially outwards. The respective guide pins 32 engage the diametrically opposed guide slots 31 of the guide sleeve 29, cf. also FIG. 1.

The rest of the structural design of the actuator 1 is analogous to FIG. 1.

It should additionally be pointed out that the two torque motors 10 and 11 are provided for redundancy reasons so that, even if one torque motor should fail, operation of the actuator 1 can still be maintained by the other torque motor.

It is also possible to use, instead of the two torque motors employed, three or more such motors. Likewise, it is imaginable to arrange the respective actuator 1 according to FIGS. 1 and 2 for parallel operation, i.e. two or more of such actuators are arranged in parallel and serve to adjust, together or alternatively, the respective control device 2. In addition, it is imaginable that two or more actuators 1 act on the control device 2 from opposite sides. A parallel operation with two or more actuators on each side is also possible in this case.

According to the present invention, the use of a gearbox is not necessary; instead, the hollow shaft of the respective torque motor acts directly on the thread drive for displacing the control device, cf. e.g. the gate valve 3 according to FIGS. 1 and 2. The safety clutch is especially provided for preventing collision damage, i.e. that the high torques of the torque motor will not cause damage to the control device or the actuator in the case of blockage or the like and that, before this happens, the hollow shaft 12 and the thread drive 5 will be forcibly separated especially in the case of a predetermined torque.

The torque motors 10, 11 as well as the safety clutch 14 have a compact structural design, whereby the overall length or the overall width of the actuator 1 in its entirety will be reduced.

Furthermore, it is not necessary to mechanically lock the electric drive for maintaining a specific attained position of the control device 2. Instead, the attained position is maintained by an appropriate standby current of the torque motor. The control device and the gate valve, respectively, will only be displaced by the thread drive 5 when the holding torque generated by this standby current has been eliminated by an appropriate propulsion current of the motor.

Likewise, it is also possible to dispense with the return spring 47, cf. the second embodiment, whereby the overall length of the actuator 1 will be reduced still further. A return movement of the control device is in this connection effected by the torque motor and its actuation of the thread drive.

Figure 3:
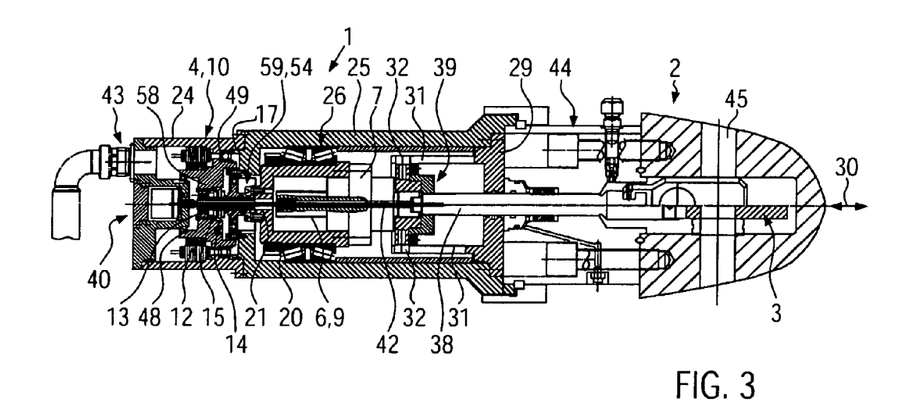
FIG. 3 shows a longitudinal section, analogously to FIG. 1, through a third embodiment of an actuator according to the present invention.

FIG. 3 shows a longitudinal section through a further embodiment of an actuator according to the present invention. In connection with this embodiment as well as in connection with the subsequent embodiments, in particular the differences existing between the individual embodiments will be referred to, whereas, with respect to the other details of each embodiment, reference will be made to the above-described FIGS. 1 and 2. Identical components are identified by identical reference numerals.

FIG. 3 shows, especially in addition, a gear unit 53 in the form of a harmonic drive 54. Such a harmonic drive normally comprises three parts, viz. a cylindrical and deformable flexspline with external teeth, an annular element with internal teeth and an elliptical disk or wave generator. By means of a harmonic drive, substantial changes in the transmission ratio can be accomplished. The flexspline is connected to the connection sleeve 20 such that it is secured against rotation relative thereto. The annular element is connected to the second housing section 25 through a flange. The annular element is in engagement with the cylindrical flexspline via a few teeth. The cylindrical flexspline abuts on the wave generator on the inner circumference thereof. The wave generator is connected to the driving side 15 of the safety clutch unit 14 such that it is secured against rotation relative thereto.

Another difference between the actuator according to FIG. 3 and the hitherto described actuators is that the safety clutch unit 14 is arranged in the interior of the hollow shaft 12, where said hollow shaft is provided with a constriction of diameter 58. The driven side 13 of the safety clutch unit 14 is secured to said constriction of diameter 58 such that it is secured against rotation relative thereto.

The outer surface of the hollow shaft 12 has additionally provided thereon an appropriate torque motor 10 as an electric drive 4. The respective torque motor can, however, be implemented as a dual-winding torque motor, i.e. that a single torque motor can be used, which is provided with two independent, separately controllable stator windings that can, each individually, be used for rotating the electric drive. It follows that, if one stator winding should fail, the actuator 1 can still be operated by the other stator winding.

Figure 4:
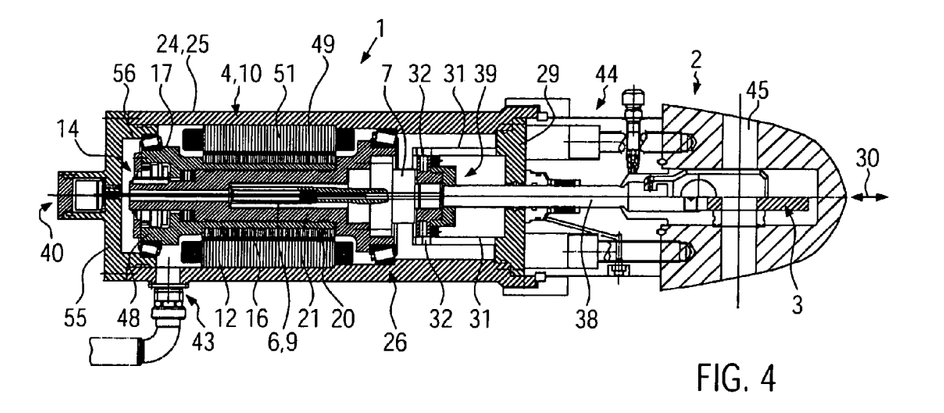
FIG. 4 shows a longitudinal section, analogously to FIG. 1, through a fourth embodiment of an actuator according to the present invention.
Figure 5:
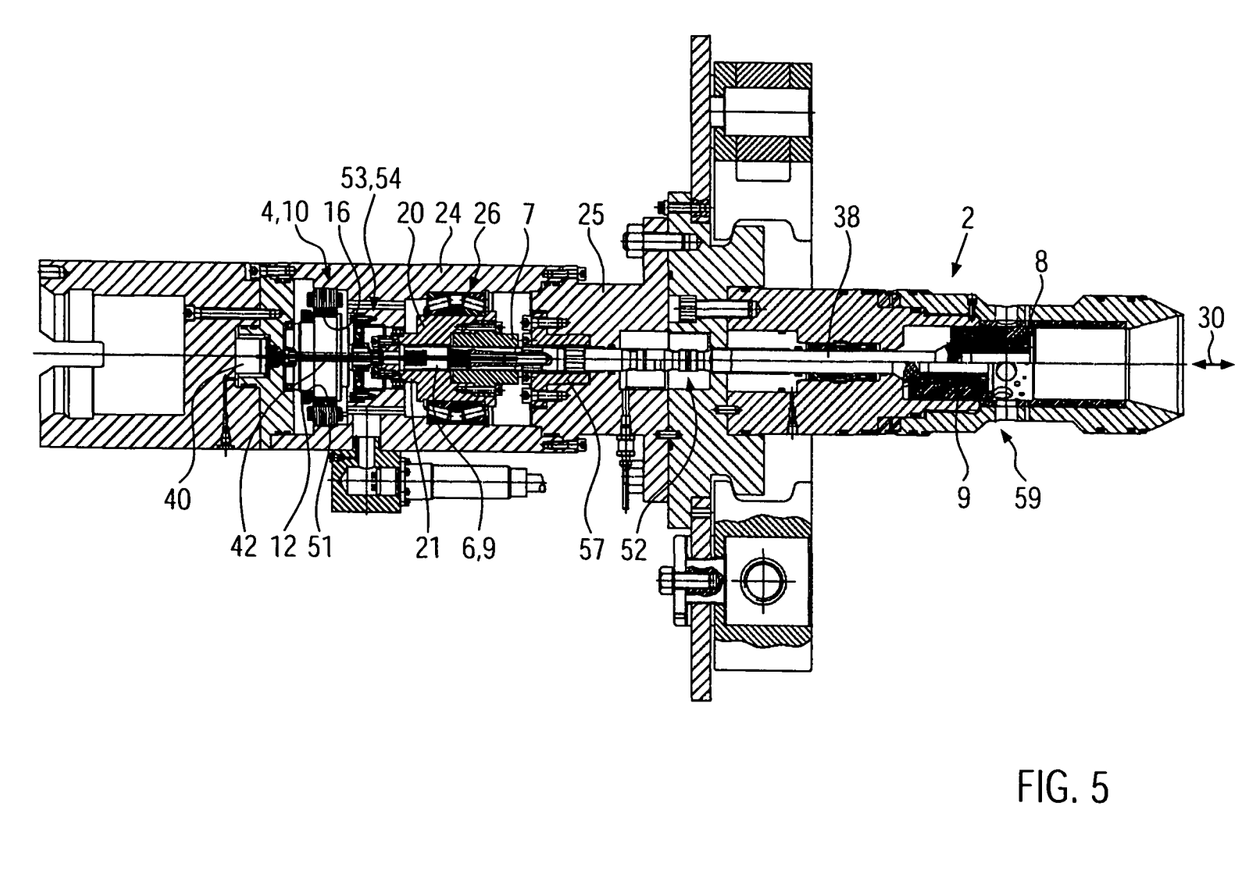
FIG. 5 shows a longitudinal section, analogously to FIG. 1, through a fifth embodiment of an actuator according to the present invention.

However, also in the case of the embodiments according to FIGS. 3 to 5 two or more torque motors may be used, cf. the embodiments according to FIGS. 1 and 2.

In FIG. 4 a fourth embodiment of an actuator 1 according to the present invention is shown. This actuator 1 is provided with a one-part housing comprising a first and a second housing section 24, 25. The open ends of said one-part housing are closed by respective inserts, cf. end insert 55 and guide sleeve 29.

Also most of the connection sleeve 20 is arranged in the interior of the hollow shaft 12, so is the safety clutch unit 14, cf. in this respect also FIG. 3. The safety clutch unit 14 is arranged in the interior of the hollow shaft 12 at the hollow shaft end facing the motion sensor 40, the driven side of the safety clutch unit being there secured in position such that it is secured against rotation relative to said hollow shaft end. The arrangement of the safety clutch unit 14 on the respective driving journal 21 of the connection sleeve 20 can e.g. be analogous to the arrangement shown in FIGS. 1 and 2.

Only the first end portion 48 of the hollow shaft 12 is supported such that the outer side 17 thereof is rotatable relative to an insert sleeve 56 of the end insert 55 as shown in FIG. 4.

The inner side of the hollow shaft 12 and the connection sleeve 20 with its driving journal 21 have arranged between them an axial bearing. A rotary displacement between the connection sleeve 20 and the hollow shaft 12 only takes place in the case of excessive loads in response to which the safety clutch unit 14 decouples. Otherwise, the hollow shaft 12 and the connection sleeve 20 rotate in common.

In the area of the screw nut 7, the outer side of the connection sleeve 20 is rotatably supported on the inner side of the housing via the rotation-type bearing unit 26.

Also in the case of the embodiment according to FIG. 4, the torque motor 10 can be a dual-winding torque motor, cf. the above statements made in this connection.

FIG. 5 shows a fifth embodiment of an actuator 1 according to the present invention. This embodiment does not show a gate valve of a control device 2, but a throttle device 59 is arranged such that it is displaceable in directions of displacement 30 by moving the threaded spindle 6 between an advanced position 8 and a retracted position 9. Since, in the case of such a throttle device 59, a possible rotation of the threaded spindle 6 during its axial displacement is admissible, the use of a respective guide sleeve 29 can be dispensed with, cf. instead e.g. FIG. 1. The throttle device 59 in question is connected to the threaded spindle 6 via the piston rod 38 and a coupling means 52. The displacement of the threaded spindle 6 between the advanced position 8 and the retracted position 9 is effected by rotating the screw nut 7, the advanced position being shown in the upper half of FIG. 5, cf. in particular the throttle device 59, and the retracted position being shown in the lower half of said FIG. 5.

The rotation of the screw nut 7 is effected, analogously to the hitherto described embodiments, by an appropriate rotation of the connection sleeve 20. This connection sleeve 20 is connected via its driving journal to the gear unit 53 whose structural design is analogous to that of the gear unit according to the embodiment of FIG. 3. The safety clutch unit 14 is arranged in the interior of the hollow shaft 12, cf. also FIGS. 3 and 4.

Also in FIG. 5 a dual-winding torque motor 10 is used as an electric drive 4.

As regards the motion sensor 40, it should additionally be pointed out that the sensor element 42 of said motion sensor, cf. also FIGS. 3 and 4, can extend through the hollow shaft 12, the safety clutch unit 14, the connection sleeve 20 and its driving journal 21 as well as through the threaded spindle 6 up to and into the piston rod 38 or at least up to the piston rod 38. Said sensor element 42 may also extend even further up to the control device 2. In this way, not only an indirect displacement of the control device 2 is detected via the displacement of the threaded spindle 6, but the displacement of the piston rod 38 and of the control device 2 are detected directly.

Furthermore, it should be pointed out that in the embodiment for a control device 2 according to FIG. 5 an insert sleeve 57 is used, in view of the fact that no guide sleeve 29 is used here. Said insert sleeve 57 serves to guide the threaded spindle 6 in the second housing section 25. The second housing section 25 can be connected from outside to the respective control device 2 by means of a flange.

The invention claimed is:

1. An actuator (1) for displacing a control device (2) for use in oil or gas production systems, comprising:
    an electric drive (4) comprising a torque motor (10, 11);
    a hollow shaft (12) driven by the electric drive (4);
    a safety clutch unit (14) comprising a driven side (13) and a driving side (15), the driven side (13) of the safety clutch unit (14) being connected to the hollow shaft (12) at an interior driving end portion of the hollow shaft (12);
    a thread drive (5) displaceable by the electric drive (4) and comprising:
        a threaded spindle (6) displaceable in a substantially axial direction between an advanced position (8) and a retracted position (9) so as to displace the control device (2); and
        a screw nut (7) supported such that it is rotatable and axially non-displaceable, the screw nut (7) being connected for rotation to and by the driving side (15) of the safety clutch unit (14).

2. The actuator of claim 1, wherein torque motor (10, 11) further comprises a rotor (16) secured on an outer side (17) of the hollow shaft (12).

3. The actuator of claim 2, wherein an outer side (17) of the hollow shaft comprises a radially outward projecting abutment projection (18), the rotor (16) being held between the abutment projection (18) and a counter element (19).

4. The actuator of claim 1, further comprising at least two torque motors (10, 11) arranged on the hollow shaft (12).

5. The actuator of claim 1, further comprising a connection sleeve (20) coupling the driving side (15) of the safety clutch unit (14) and the screw nut (7).

6. The actuator of claim 5, further comprising a driving journal (21) projecting from the connection sleeve (20) in a substantially axial direction, and wherein the safety clutch unit (14) is secured to the driving journal (21) on the driving side (15).

7. The actuator of claim 6, wherein the safety clutch unit (14) is secured to the driving journal (21) by a clamping device (22) so as to prevent rotation relative thereto.

8. The actuator of claim 6, wherein the driving journal (21) comprises an axial hole (23).

9. The actuator of claim 1, further comprising a first housing section (24) accommodating the electric drive (4) and a second housing section (25) accommodating the thread drive (5), the first and second housing sections being detachable from one another.

10. The actuator of claim 5, further comprising:
    a first housing section (24) accommodating the electric drive (4) and a second housing section (25) accommodating the thread drive (5), the first and second housing sections being detachable from one another; and
    a bearing unit (26) arranged between an inner side (27) of the second housing section (25) and an outer side (28) of the connection sleeve (20) so as to rotatably support the connection sleeve (20).

11. The actuator of claim 1, wherein the threaded spindle (6) is supported in an axially displaceable but non-rotatable manner.

12. The actuator of claim 11, further comprising a guide sleeve (29) comprising a guide slot (31) engaged by a guide pin (32) projecting radially outwards relative to the threaded spindle (6).

13. The actuator of claim 11, further comprising:
    two housing sections (24, 25) detachable from one another,
        a first housing section (24) accommodating the electric drive (4) and a second housing section (25) accommodating the thread drive (5) and comprising an end opening (33) opposite to the first housing section (24); and
    a guide sleeve (29) comprising:
        an opening insert (34) which covers the second housing section end opening (33); and
        an opening (35) for passing the threaded spindle (6) therethrough.

14. The actuator of claim 1, wherein the threaded spindle (6) is connected to a piston rod (38) at an end (37) facing the control device (2).

15. The actuator of claim 1, further comprising a connection element (39) releasably secured to the threaded spindle (6), the guide pin (32) projecting radially outwards from the connection element (39).

16. The actuator of claim 1, further comprising a motion sensor (40) comprising a sensor element (42) configured to measure the threaded spindle (6).

17. The actuator of claim 1, further comprising a plug device (43) configured to transmit at least one of control signals, datat, and a supply voltage.

18. The actuator of claim 9, wherein the second housing section (25) is connectable to a connection housing (44), which is adapted to be flange-mounted.

19. The actuator of claim 18, further comprising a spring sleeve (46) arranged between the connection housing (44) and the second housing section (25), the spring sleeve (46) configured to accommodate a return spring (47).

20. The actuator of claim 19, wherein the return spring (47) is operative between the spring sleeve (46) and the threaded spindle (6).

21. The actuator of claim 1, wherein the hollow shaft (12) is rotatably supported.

22. The actuator of claim 21, wherein the hollow shaft (12) comprises an end portion (49) connected to the driven side (13) of the safety clutch unit (14) so as to prevent rotation relative thereto.

* * * * *